(12) United States Patent
Riggert et al.

(10) Patent No.: US 11,547,120 B2
(45) Date of Patent: Jan. 10, 2023

(54) HOLDING APPARATUS FOR HOLDING A GUTTED POULTRY CARCASS OR A PART THEREOF DURING PROCESSING IN A DEVICE FOR PROCESSING GUTTED POULTRY CARCASSES OR PARTS THEREOF

(71) Applicant: Nordischer Maschinenbau Rud. Baader GmbH + Co. KG, Lübeck (DE)

(72) Inventors: Lasse Riggert, Lübeck (DE); Andreas Landt, Lübeck (DE); Valentin Fischer, Lübeck (DE)

(73) Assignee: NORDISCHER MASCHINENBAU RUD. BAADER GMBH + CO.KG, Lübeck (DE)

( * ) Notice: Subject to any disclaimer, the term of this patent is extended or adjusted under 35 U.S.C. 154(b) by 0 days.

(21) Appl. No.: 17/426,259

(22) PCT Filed: Jan. 24, 2020

(86) PCT No.: PCT/EP2020/051753
§ 371 (c)(1),
(2) Date: Jul. 28, 2021

(87) PCT Pub. No.: WO2020/156944
PCT Pub. Date: Aug. 6, 2020

(65) Prior Publication Data
US 2022/0095632 A1 Mar. 31, 2022

(30) Foreign Application Priority Data
Jan. 29, 2019 (EP) ..................................... 19154189

(51) Int. Cl.
*A22C 21/00* (2006.01)

(52) U.S. Cl.
CPC ...... *A22C 21/0046* (2013.01); *A22C 21/0053* (2013.01)

(58) Field of Classification Search
CPC .............. A22C 21/038; A22C 21/0046; A22C 21/0053
(Continued)

(56) References Cited
U.S. PATENT DOCUMENTS 3,983,601 A 10/1976 Verbakel
5,045,024 A * 9/1991 Diesing .............. A22C 21/0046
269/48.1
(Continued)

FOREIGN PATENT DOCUMENTS

BR   PI 0812595-3 A1   12/2012
CN      101410321 A     4/2009
(Continued)

OTHER PUBLICATIONS

International Search Report dated Apr. 20, 2020; International Application No. PCT/EP2020/051753.

*Primary Examiner* — Richard T Price, Jr.
(74) *Attorney, Agent, or Firm* — Dinsmore & Shohl LLP (57) ABSTRACT

A holding apparatus for holding a gutted poultry body/part during processing has a support body supporting the body/part, a fastening body for holding the support body and fastening the holding apparatus to a circulatingly driven transport unit, and a clamping device for securing the body/part to the support body. The clamping device has a hook for penetrating into soft parts and a clamping lever. The lever has a clamping jaw for clamping parts of the body/part against the hook lower side directed towards the support body. The hook lower side is spaced apart from the support body to form a free space for receiving the parts to be clamped. The clamping lever is movable, against a spring force, from a standby position into a clamping position, and (Continued)

back. The clamping lever also has a centring shoulder projecting into the free space when the clamping lever is in the standby position.

20 Claims, 5 Drawing Sheets

(58) Field of Classification Search
USPC .................................................. 452/177
See application file for complete search history.

(56) References Cited

U.S. PATENT DOCUMENTS

| | | | |
|---|---|---|---|
| 5,833,527 A | 11/1998 | Hazenbroek et al. | |
| 6,837,782 B2 * | 1/2005 | Hetterscheid | A22C 21/0053 |
| | | | 452/179 |
| 8,100,448 B2 | 1/2012 | Holmstrom | |
| 8,540,556 B2 | 9/2013 | Hiddink et al. | |
| 8,678,887 B2 * | 3/2014 | Evers | A22C 21/0023 |
| | | | 452/194 |
| 9,173,413 B2 | 11/2015 | Peters et al. | |
| 9,463,960 B2 | 10/2016 | Pantsar et al. | |
| 9,775,362 B2 | 10/2017 | Van Mil et al. | |
| 2009/0275275 A1 | 11/2009 | Evers | |
| 2014/0357172 A1 | 12/2014 | Peters et al. | |

FOREIGN PATENT DOCUMENTS

| | | |
|---|---|---|
| CN | 104364184 A | 2/2015 |
| CN | 106163289 A | 11/2016 |
| CN | 207084013 U | 3/2018 |
| DE | 102006040454 B3 | 12/2007 |
| EP | 0838156 A2 | 4/1998 |
| EP | 1415540 A1 | 5/2004 |
| EP | 1541030 A2 | 6/2005 |
| JP | S5068876 A | 6/1975 |
| JP | H0319645 A | 1/1991 |
| WO | 9831234 A1 | 7/1998 |

* cited by examiner

HOLDING APPARATUS FOR HOLDING A GUTTED POULTRY CARCASS OR A PART THEREOF DURING PROCESSING IN A DEVICE FOR PROCESSING GUTTED POULTRY CARCASSES OR PARTS THEREOF

CROSS-REFERENCE TO RELATED APPLICATIONS

This application is the U.S. National Stage of PCT/EP2020/051753 filed Jan. 24, 2020, which claims priority to European Application No. 19154189.5, filed Jan. 29, 2019, the entire content of both are incorporated herein by reference in their entirety.

FIELD OF THE INVENTION

The invention relates to a holding apparatus which is configured and adapted for holding a gutted poultry body or a part thereof, in particular a breast cap, during processing in an apparatus for processing gutted poultry bodies or parts thereof, the holding apparatus comprising a support body which is configured and adapted for supporting the poultry body or the part thereof, a fastening body which is configured and adapted for holding the support body, on the one hand, and for fastening the holding apparatus to a circulatingly driven transport unit of the apparatus for processing gutted poultry bodies or parts thereof, on the other hand, and a clamping device which is configured and adapted for securing the poultry body or the part thereof to the support body during processing; the clamping device comprising a hook which is configured and adapted for penetrating into soft parts of the poultry body or the part thereof and a clamping lever, comprising clamping jaws, which is configured and adapted for clamping parts of the poultry body or the part thereof against the lower side of the hook directed towards the support body, the hook being arranged such that its lower side is spaced apart from the support body in order to form a free space for receiving the parts of the poultry body or the part thereof to be clamped, and the clamping lever being designed so as to be movable, counter to a spring force, out of a standby position into a clamping position, and back again.

The invention further relates to a transport apparatus which is configured and adapted for transporting gutted poultry bodies or parts thereof, comprising a circulatingly driven transport unit and at least one holding apparatus fastened thereto, which is configured and adapted for holding the gutted poultry body or the part thereof during processing in an apparatus for processing gutted poultry bodies or parts thereof.

The invention is further concerned with the use of a transport apparatus in an apparatus for processing gutted poultry bodies or parts thereof.

In addition, the invention is directed at an apparatus for processing gutted poultry bodies or parts thereof, which comprises at least one processing station for processing the poultry bodies or parts thereof as well as a transport apparatus for transporting the poultry bodies or parts thereof along the or each processing station.

Finally, the invention is concerned with a method for saddle-mounting a gutted poultry body or a part thereof on a holding apparatus according to one or more of claims 1 to 12, comprising the steps: mounting the poultry body or a part thereof onto a support body of the holding apparatus, the poultry body or the part thereof, when being mounted with parts of the poultry body or the part thereof to be clamped, being brought into a free space formed between the support body and a hook of a clamping device, while the hook penetrates soft parts of the poultry body or the part thereof, and moving a clamping lever of the clamping device out of a standby position into a clamping position in which a clamping jaw of the clamping lever secures the poultry body or the part thereof or the parts to be clamped between itself and the hook.

BACKGROUND OF THE INVENTION

In the poultry processing industry, gutted poultry bodies or parts thereof are processed in appropriate apparatuses. For processing, the poultry bodies or parts thereof are to be positioned with respect to the respective processing tools. Usually, a plurality of holding apparatuses are fastened to a circulatingly driven transport unit, by means of which the poultry bodies or parts thereof are fed to one or a plurality of processing stations or are brought into the operating area thereof. For processing, the poultry bodies or parts thereof are automatically or manually mounted on and secured to the holding apparatus. This process is referred to overall as saddle-mounting. High-quality and yield-efficient processing of the poultry bodies or parts thereof requires secure and above all symmetrical saddle-mounting of the poultry bodies or parts thereof on the holding apparatus.

The holding apparatus described hereinbefore is known as a transport saddle and also comprises, in addition to the fastening body and the clamping device, which is usually associated with the fastening body, the support body which is generally releasably attached to or on the fastening body. The hook as a component of the clamping device is also attached to the fastening body, usually fixed, while the clamping lever for clamping in particular bone components of the poultry body or parts thereof is pivotably mounted on the fastening body. Mounting onto the support body can be performed by pushing and/or pulling.

Symmetrical and secure saddle-mounting of breast caps as a part of the gutted poultry body on the holding apparatus is particularly important. The breast caps to be processed have a breast cap carcass which comprises at least one breast bone, one pair of V-shaped coracoid bones arranged on the breast bone in the region of a breast plate and two breast fillets covering the breast bone. The breast plate is part of the breast bone which additionally comprises the so-called keel bone. Accordingly, in terms of the invention, the breast plate and keel bone form the breast bone which is T-shaped in cross-section. In this case, the breast plate forms the short stroke of the T, while the keel bone represents the long stroke of the T. The two coracoid bones extend from the breast bone, opening up outwards to form the V-shape. In the processing of breast caps, e.g. when obtaining breast fillets from the breast cap carcass or when cutting free the breast bone, saddle-mounting the breast caps securely and symmetrically on the support body is particularly important, as the knives, preferably two circular knives arranged at a distance from each other, which cut free the breast bone, have no guidance whatsoever through the (breast cap) carcass.

Until now, the poultry bodies or parts thereof, based on the example of obtaining breast fillets from the (breast cap) carcass, have been mounted on the holding apparatuses being transported past in a mounting direction predetermined by the design of the support body by an operator using a pushing and/or preferably pulling motion. For this purpose, the breast cap is moved with the neck side first, i.e.

the breast cap carcass with the open side of the V-shaped arrangement of coracoid bones, in the direction of the hook facing contrary to the mounting direction, the hook being fixed and acting like a skewer at least during processing, which also includes mounting the breast cap on the holding apparatus. At the same time, the hook penetrates soft parts, i.e. the soft flesh of the breast cap or breast fillets. When the breast cap is saddle-mounted symmetrically, the breast plate located between the coracoid bones, which represents a cartilaginous/bony connection between the two coracoid bones in the region of the breast bone, is brought under the hook with a free end such that the breast cap lies with the free end of the breast plate between the support body and the hook, the hook pressing as it were on the free end of the breast plate of the breast cap carcass, while the breast bone with the (remaining) breast plate lies on the support body and the keel bone extends substantially perpendicular away from the support body, such that the breast fillets covering the breast bone point towards the processing station, for example towards the knives. In this position, the breast cap is not yet sufficiently secured to the support body.

Subsequently, i.e. with a time delay after complete insertion of the hook into the soft parts, the holding apparatus with the breast cap not yet sufficiently secured is transported further along the circulating transport unit, the holding apparatus thereby passing a cam member which results in the clamping lever being moved, e.g. via an actuating means controlled by the cam member, from the inside of the holding apparatus out of the standby position into the clamping position, the clamping jaw of the clamping lever pressing against the inner side of the breast cap from inside such that only then is the breast cap sufficiently secured with the breast plate between the clamping jaw of the clamping lever and the hook. In this context, from inside means that, in the standby position, the clamping lever is still covered by the support body, at least with regard to the clamping jaw.

On the one hand, the known holding apparatuses have the disadvantage that the hook can insert into the soft flesh of the breast fillets in an uncontrolled manner, i.e. without any guidance, during mounting of the breast caps. This means that the symmetrical alignment of the breast caps, which is fundamental to subsequent processing, depends on the operator in each case. As a result, the breast caps are sometimes saddle-mounted crookedly or asymmetrically. On the other hand, there is a risk that the breast cap is not sufficiently secured during transport of the holding apparatus from the position in which the breast cap is mounted to the position in which the actuating means moves the clamping lever out of the standby position into the clamping position and accordingly it can slip out of the position/location predetermined by mounting. In practice, this results in the two knives, which are arranged at a distance from each other for separating the breast fillets from the breast bone or when cutting free the breast bone, cutting into the flesh on one side next to the breast bone when in an asymmetrical position, i.e. not taking the breast bone into their midpoint as necessary and desirable. Another disadvantage is that actuating the clamping lever out of the standby position into the clamping position and back requires a complex mechanism, e.g. with a cam member and an actuating means, that takes up installation space.

SUMMARY OF THE INVENTION

Thus the object of the invention is to create a simply designed and improved holding apparatus with regard to symmetrical saddle-mounting of breast caps. A further object of the invention is to provide a corresponding transport apparatus and apparatus for processing gutted poultry bodies or parts thereof. The object further consists of proposing an easy and reliable method for securely and symmetrically saddle-mounting the breast caps on the holding apparatuses.

This object is achieved by a holding apparatus of the type referred to hereinbefore in that in addition to clamping jaws, the clamping lever comprises a centring shoulder which projects into the free space between the lower side of the hook and the support body when the clamping lever is in the standby position. This means that the centring shoulder "is in the way of the breast cap" when the breast cap is mounted on the support apparatus, such that the breast cap also necessarily strikes against the centring shoulder during mounting. More precisely, in the standby position of the clamping lever, the centring shoulder projects over the support body such that the centring shoulder at least partially covers or conceals the free space between hook and support body when viewed in the mounting direction. Thus, the invention utilises the cartilaginous/bony connection of the V-shaped arrangement of the coracoid bones of the breast cap for centring. The V-shaped arrangement of the coracoid bones is used to guide the breast cap centrally and symmetrically onto the support body. The cartilaginous/bony connection which actually forms the breast plate, then hits the centring shoulder in the middle and takes it along. This centres the breast cap on the support body, in that the coracoid bones take the centring shoulder into their midpoint with the inner sides of the coracoid bones opposite each other until the breast plate, which is located in the region where the two coracoid bones join, strikes against the centring shoulder and takes it along during a continued mounting movement. In other words, as a result of mounting and the contact thus arising between the breast cap carcass and the centring shoulder, the operator moves said centring shoulder as a component of the clamping lever out of its standby position such that locking or securing of the breast plate is carried out at the same time as centring takes place, as the clamping jaw of the clamping lever is also moved out of the standby position into the clamping position due to the breast cap carcass taking along the centring shoulder. The mounting movement thus initiates both a centring process for the breast cap and the locking process of the breast cap on the support body. As a result, symmetrical saddle-mounting of the breast cap on the holding apparatus is achieved with low demands on the operator. In addition, this can achieve a shortened installation space.

An especially preferred development of the invention is characterised in that the holding apparatus is configured and adapted for a mounting direction T of the poultry body or the part thereof onto the support body that extends parallel to the plane of symmetry E of the support body and is directed contrary to a free end of the hook. This ensures a kind of pulling mounting movement towards the hook for symmetrical saddle-mounting.

Advantageously, in the standby position of the clamping lever, the centring shoulder extends into the region close to the lower side of the hook directed towards the support body. This means that the centring shoulder projects so far out of the support body, substantially perpendicular to the mounting direction, that it almost reaches the lower side of the hook, the distance between the free end of the centring shoulder and the hook being selected, on the one hand, as small as possible in order to form as large a contact surface as possible for the breast cap carcass and, on the other hand, the distance being large enough to prevent the centring shoulder from touching or even colliding with the hook when the clamping lever pivots out of the standby position.

An advantageous embodiment is characterised in that, transverse to the mounting direction T, the centring shoulder extends over part of the width of the support body. This embodiment also ensures that a large contact surface is formed so that the centring shoulder is reliably struck by the breast cap when the breast cap is being mounted.

Expediently, transverse to the mounting direction T, the centring shoulder is designed to be wider than the free end of the hook. In addition to further increasing the contact surface, this ensures that the hook is at least partially covered by the centring shoulder such that the breast cap or parts thereof first come into contact with the centring shoulder during mounting before the hook can completely penetrate the soft flesh of the breast cap.

A preferred development is characterised in that, the centring shoulder is located at least on the same level as the free end of the hook, but preferably in front of the free end of the hook, when the clamping lever is in the standby position in mounting direction T of the poultry body or the part thereof onto the support body. This further reinforces the advantages previously described. As a result of this embodiment, the hook comes into contact with the breast cap after the centring shoulder, spatially and in terms of time, such that pre-centring takes place first before the hook penetrates the flesh. As the clamping lever is pivotable out of the standby position into the clamping position against a spring force, a certain force is required for pivoting in order to overcome the spring force. The contact between the clamping lever and more precisely the centring shoulder on the one hand and the breast cap on the other hand occurs in the region of the breast plate between the coracoid bones when the breast cap is being saddle-mounted by the operator. Unlike the flesh of the breast fillets, this area is firm and thus suitable for the centring process. Only when the operator brings the breast cap into a central position by pressing on this contact point, does the clamping lever begin to move and release the hook so that it can penetrate the flesh. Accordingly, the clamping lever is assigned a dual function which the operator initiates during mounting.

In the standby position of the clamping lever, the clamping jaw of the clamping lever is preferably in a retracted position inside the support body and, in the standby position of the clamping lever, the centring shoulder of the clamping lever projects beyond the support body, while, in the clamping position of the clamping lever, the clamping jaw of the clamping lever projects beyond the support body and, in the clamping position of the clamping lever, the centring shoulder of the clamping lever is in a retracted position inside the support body. This embodiment/arrangement first ensures centring and then securing in a reliable manner. The support body is usually mounted onto the fastening body and covers the clamping device in the standby position, such that only the centring shoulder projects from the support body into the free space between support body and hook. As a result, the holding apparatus is initially set up for centring. In the clamping position, the centring shoulder inserts into the support body, thus uncovering the free space such that the clamping jaw enters the free space due to the pivoting movement and presses the breast cap against the hook from inside. As a result, the holding apparatus is then set up for securing.

Optionally, the centring shoulder is integrally joined to the clamping lever, the clamping lever being movable out of the standby position into the clamping position via the centring shoulder controlled by the product. This embodiment, namely centring and securing by hand, initiated by a flowing movement of the operator when saddle-mounting the breast cap, executed due to contact of the breast cap with the clamping lever, hence controlled by the product, means that there is no need for a complex mechanism for locking. Rather, centring and securing are executed in a flowing movement at one position of the holding apparatus.

Advantageously, the centring shoulder forms the free end of the clamping lever in such a manner that the centring shoulder precedes at a fixed distance when the clamping lever moves out of the standby position into the clamping position of the clamping jaw. This ensures a defined and synchronised sequence of the dual function of centring and securing in a simple manner.

A preferred development is characterised in that the centring shoulder at least partially covers the free end of the hook frontally, at least when the clamping lever is in the standby position, namely in mounting direction T, or laterally, namely parallel to the mounting direction T. Frontal covering describes that in the mounting direction the centring shoulder is not just positioned in front of the hook but also projects from the support body beyond the hook such that the support body is at least partially, but preferably completely, covered by the centring shoulder. This prevents any kind of contact between the breast cap and the hook until the centring shoulder has centred the breast cap. A corresponding effect is achieved with the lateral covering. Lateral covering describes that in the mounting direction the centring shoulder is not only positioned in front of the hook but the hook is flanked at least on one side, but preferably on both sides. Preferably, one part of the centring shoulder, viewed in the mounting direction, is positioned to the left of the hook and another part to the right of the hook.

Especially advantageously, the centring shoulder, viewed in mounting direction T, is U-shaped in such a manner that, at least in the standby position of the clamping lever, the hook is located between the two limbs of the U-shaped centring shoulder or, when the clamping lever moves out of the standby position into the clamping position, can insert into the centring shoulder or insert through the centring shoulder. This embodiment further reinforces the advantages previously described.

The clamping lever is preferably connected to a locking mechanism which is self-locking in the clamping position. This ensures reliable securing that can only be opened again from outside.

The object is also achieved by a transport apparatus of the type referred to hereinbefore in that the or each holding apparatus is configured and adapted as described herein.

The object is further achieved in that, when using a transport apparatus in an apparatus for processing poultry bodies or parts thereof, a transport apparatus as described herein is used.

The object is also achieved by an apparatus for processing gutted poultry bodies or parts thereof of the type referred to hereinbefore in that the transport apparatus is configured and adapted as disclosed herein.

The object is further achieved by a method with the steps referred to hereinbefore in that the poultry body or the part thereof is centred on the support body by means of a centring shoulder of the clamping lever, before the hook penetrates the soft parts. In other words, the breast cap is first centred in order to secure the breast cap immediately afterwards, securing taking place by complete insertion of the hook on the one hand, and almost simultaneously moving the clamping jaw into the clamping position on the other hand.

Preferably, the method is configured and adapted for saddle-mounting of breast caps as part of the poultry body, the breast cap, when mounting onto the support body in mounting direction T, first hitting the centring shoulder with bone components and being thereby centred and, as mounting continues, the hook completely penetrating the soft parts and at the same time the clamping lever being pivoted out of the standby position into the clamping position to secure the breast cap. Centring is thereby performed in advance, while the hook penetrates the soft parts and the bone components are clamped between the clamping jaw and the hook almost simultaneously to secure the breast cap and are carried out immediately following centring. Finally, a flowing mounting motion is executed in which first the breast plate, which is located between the two coracoid bones and in the region of the breast bone, strikes against the centring shoulder and thereby centres the breast cap, and the breast cap is then moved further in the mounting direction such that the breast plate moves the clamping lever out of the standby position into the clamping position by means of the centring shoulder, such that the breast plate is moved almost simultaneously into the free space between hook and support body, while the hook completely penetrates the soft parts and the clamping jaw is moved into the clamping position. Meanwhile, the centring shoulder uncovers the free space due to the pivoting movement of the clamping lever into the clamping position.

Advantageously, the clamping lever is pivoted from the standby position into the clamping position controlled exclusively by the product, pivoting of the clamping lever out of the standby position only being initiated by the breast cap once the breast cap has been brought into a symmetrical position due to a contact of bone components with the centring shoulder.

The advantages arising from the transport apparatus according to the invention, use of the same, the apparatus for processing gutted poultry bodies or parts thereof and the method for saddle-mounting poultry bodies or parts thereof on holding apparatuses have already been described in detail in connection with the holding apparatus, which is why reference will be made to the relevant passages to avoid repetitions.

BRIEF DESCRIPTION OF THE DRAWINGS

Further expedient and/or advantageous features and developments of the holding apparatus, the transport apparatus, the use, the apparatus for processing gutted poultry bodies or parts thereof and the method emerge from the description. Especially preferred embodiments of the invention are explained in greater detail with reference to the attached drawing. The drawing shows.

DETAILED DESCRIPTION OF THE INVENTION

The holding apparatus shown in the drawing is used for holding breast caps of gutted poultry bodies. The breast caps to be processed comprise parts of the carcass, namely in particular the breast bone, coracoid bones arranged in a V-shape on the breast bone in the region of a breast plate and two breast fillets still on the carcass. However, the holding apparatus according to the invention is also configured and adapted to hold other gutted poultry bodies or parts thereof in the same manner.

Figure 7:
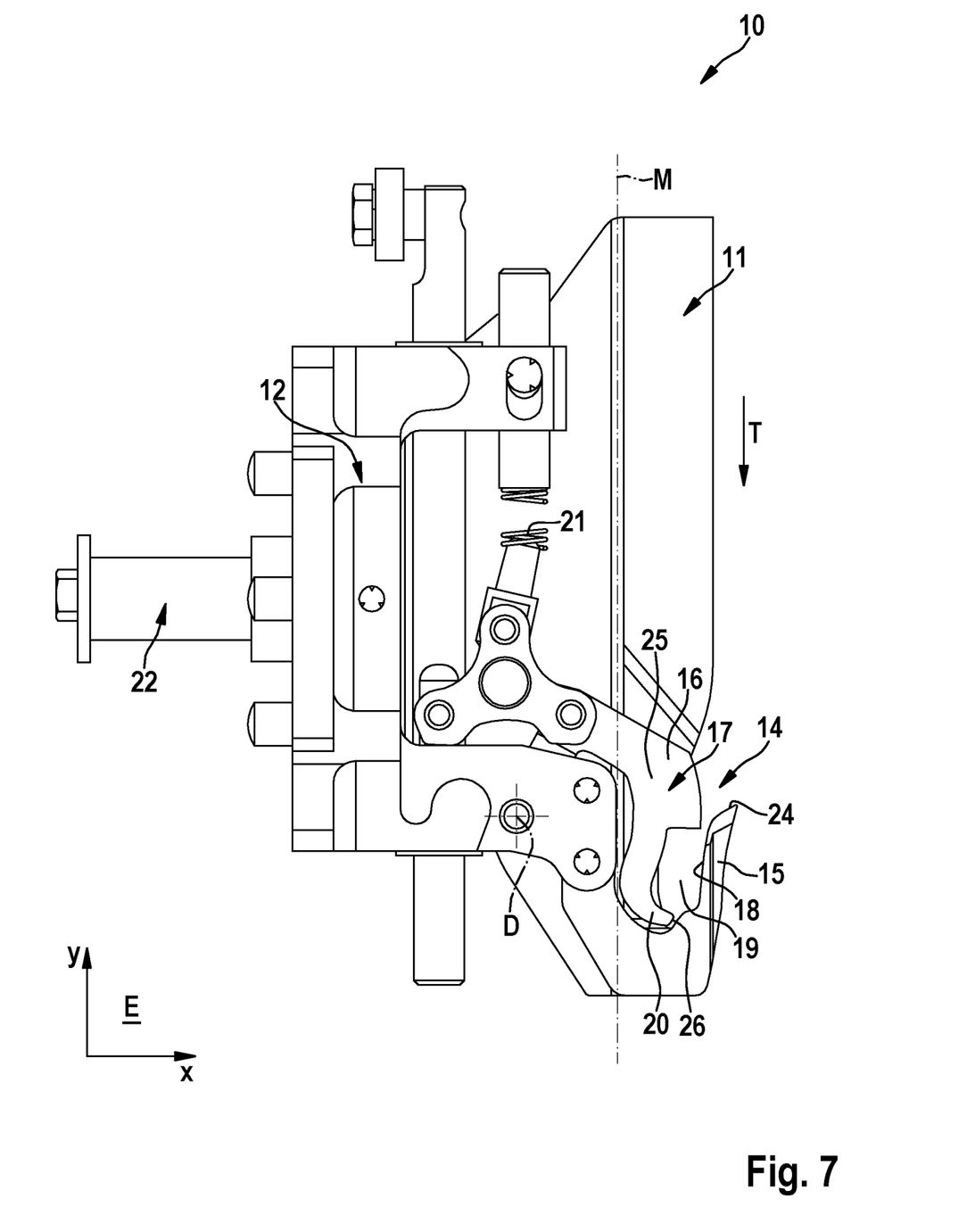
FIG. 7 is a view of the holding apparatus according to FIG. 1, the clamping lever being in the clamping position.

The holding apparatus 10 shown is configured and adapted for holding a gutted poultry body or a part thereof, in particular a breast cap, during processing in an apparatus for processing gutted poultry bodies or parts thereof. The holding apparatus 10 comprises a support body 11 which is configured and adapted for supporting the poultry body or the part thereof, a fastening body 12 which is configured and adapted for holding the support body 11 on the one hand and for fastening the holding apparatus 10 to a circulatingly driven transport unit 13 of the apparatus for processing gutted poultry bodies or parts thereof on the other hand, and a clamping device 14 which is configured and adapted for securing the poultry body or the part thereof to the support body 11 during processing, wherein the clamping device 14 comprises a hook 15 which is configured and adapted for penetrating into soft parts of the poultry body or the part thereof and a clamping lever 17, comprising clamping jaws 16, which is configured and adapted for clamping parts of the poultry body or the part thereof against the lower side 18 of the hook 15 directed towards the support body 11, wherein the hook 15 is arranged such that its lower side 18 is spaced apart from the support body 11 in order to form a free space 19 for receiving the parts of the poultry body or the part thereof to be clamped (in particular firm cartilage or bone components), and the clamping lever 17 is designed so as to be movable out of a standby position (see FIG. 1) into a clamping position (see FIG. 7), and back again.

This holding apparatus 10 is characterised according to the invention in that in addition to clamping jaws 16, the clamping lever 17 comprises a centring shoulder 20 which projects into the free space 19 between the lower side 18 of the hook 15 and the support body 11 when the clamping lever 17 is in the standby position. Free space 19 means not only the space directly below the lower side 18 of the hook 15 but also expressly the space which in mounting direction T is in front of the hook 15 and below an imaginary extension of the hook 15.

When taken on their own or in combination with each other, the features and developments described below illustrate preferred embodiments. It is expressly pointed out that features which are summarised in the description and/or the drawing or are described in a common embodiment can also further develop the holding apparatus 10 described above in a functionally independent manner.

The support body 11 can also be releasably connected to the fastening body 12, optionally with screws or the like as fastening means which are accessible from the outside. For this purpose, the support body 11 is fitted onto the fastening body 12 from above in a hood-like manner and secured with the fastening means. The support body 11 and the fastening body 12 define a central plane E (see in particular FIG. 1, E spanned between x and y axis) which runs parallel to the central axis M (see in particular FIG. 1) of the holding apparatus 10. The support body 11 is preferably connected to the fastening body 12 by means of a quick-action locking system, accessible from the outside, as the fastening means. The quick-action locking system may comprise a gripping and/or clamping and/or latching mechanism or the like.

The unit formed by the fastening body 12 and clamping device 14 is preferably made of metal, preferably stainless steel. However, other materials or material combinations can also be used. The clamping device 14 is part of the fastening body 12 and is connected thereto or disposed thereon. For this purpose, the hook 15 is preferably fixedly connected to the fastening body 12, at least in the assembled state of the holding apparatus 10, i.e. with the support body 11 fitted and secured on the fastening body 12, such that the hook 15 forms a rigid skewer, spike or the like. The clamping lever 17 is pivotably mounted about a pivot axis D on the fastening body 12. The pivotable clamping lever 17, which can be pivoted out of a standby position into a clamping position and back, is held pre-tensioned in the standby position by means of a spring 21. As a result, the clamping lever 17 is only movable out of the standby position into the clamping position against a resistance. This means that the clamping lever 17 can only be pivoted out of the standby position into the clamping position when a certain force is applied to the centring shoulder 20. Instead of the spring 21, any other known element with which a resistance can be applied, e.g. a pneumatic cylinder or the like, can also be used. The spring force of the spring 21 is preferably adjustable. Optionally, the spring 21 is also designed and arranged to be replaceable so that springs 21 with different spring forces can be used.

The support body 11 is preferably formed in one piece and made of plastic. More preferably, the support body 11 is made by the injection moulding method, by milling from the solid or by means of 3D printing. Optionally, the support body 11 can also consist of other materials and can also be made using other manufacturing methods. The holding apparatus 10 has a fastening means 22 with which the holding apparatus 10 can be connected preferably releasably to the transport unit 13. In addition, the holding apparatus 10 can have an actuating means 23 by means of which the clamping lever 17 is movable at least out of the clamping position back into the standby position in cooperation, for example, with a cam member. Optionally, the manually initiated clamping effect can also be supported via the actuating means 23 by means of a further cam member, in that the clamping lever 17 is pivoted into the clamping position via the further cam member. Fastening means 22 and actuating means 23 are preferably associated with the fastening body 12 or connected thereto.

Figure 1:
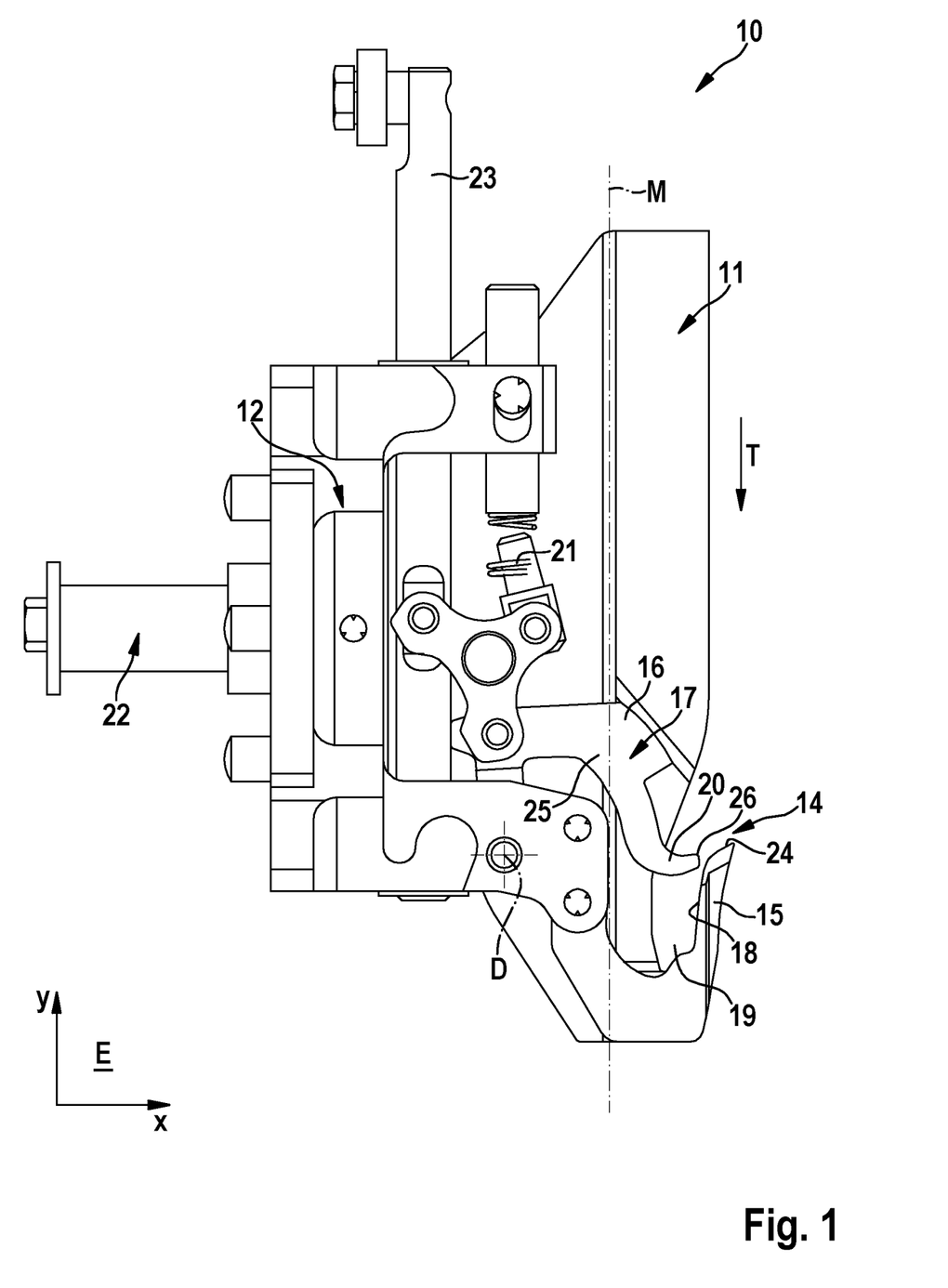
FIG. 1 is a schematic representation of a holding apparatus in lateral view, the support body (shown partially transparent for reasons of better clarity) being connected to the fastening body, which has the clamping device, and the fastening body being connectable to a transport unit, and the clamping lever in a first embodiment comprising a clamping jaw and a centring shoulder which in the standby position of the clamping lever shown projects into the free space between the lower side of the hook and the support body and is on approximately the same level as the free end of the hook in mounting direction T.

It becomes clear from the drawing that the holding apparatus 10 is configured and adapted for a mounting direction T of the poultry body or a part thereof onto the support body 11, which extends parallel to the plane of symmetry E, spanned between the x and y axis, of the support body 11 and is directed contrary to a free end 24 of the hook 15. With reference to FIG. 1, this means that an operator pushes and/or pulls, a pulling motion being preferred, e.g. a breast cap, with the coracoid bones diverging in a V-shape first, onto the support body 11 from top to bottom in the mounting direction T.

In the embodiment according to FIG. 1, in the standby position of the clamping lever 17, the centring shoulder 20 extends into the region close to the lower side 18 of the hook 15 directed towards the support body 11. In the view according to FIG. 1, the centring shoulder 20 almost completely covers the free space 19 in mounting direction T at least in height, i.e. starting from the support body 11 towards the hook 15. This means that when the breast cap (or any other part of the poultry body) is mounted on the support body 11 in the mounting direction T, it will inevitably hit the centring shoulder 20, and only the breast plate between the coracoid bones is sufficiently firm and stable enough to apply the force for pivoting the clamping lever 17. In other words, the centring shoulder 20 remains in its starting position, namely the standby position, until the breast cap is centred between the coracoid bones in the region of the breast plate by means of the centring shoulder 20. Only when the breast cap continues to be mounted beyond the point of contact between the breast plate and the centring shoulder 20 is the clamping lever 17 pivoted out of the standby position into the clamping position, thereby releasing the free end 24 of the hook 15 which can then penetrate the soft flesh of the breast fillet.

The centring shoulder 20 extends transverse to the mounting direction T (into the plane of the sheet) over part of the width of the support body 11. The support body 11 is recessed to be appropriately wide, in such a manner that the centring shoulder 20 can insert into the support body 11 when pivoting into the clamping position. In width, the centring shoulder 20 can be designed just as wide as the free end 24 of the hook 15. Preferably, transverse to the mounting direction T, the centring shoulder 20 is designed to be wider than the free end 24 of the hook 15.

Figure 2:
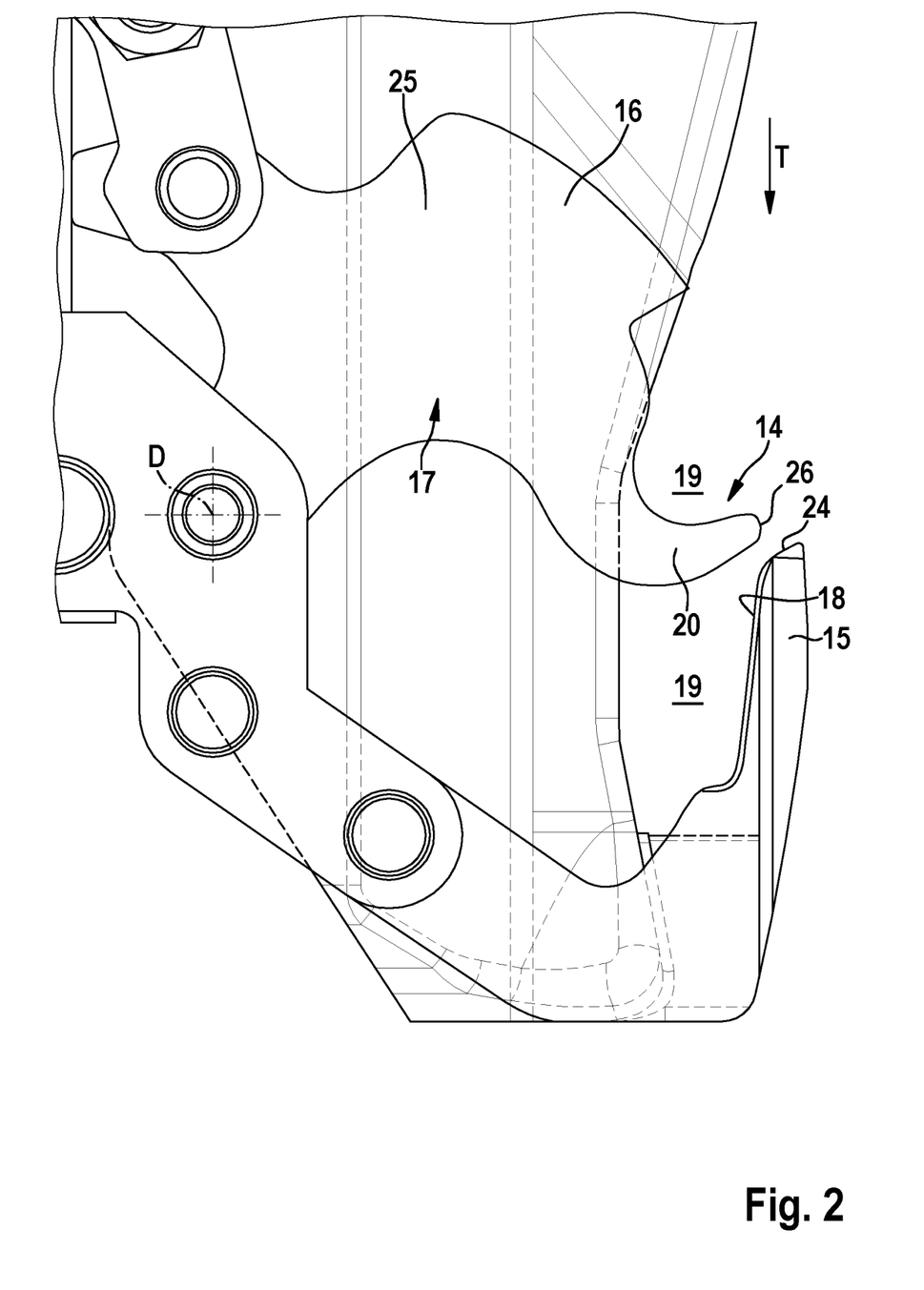
FIG. 2 is an enlarged detail view of a holding apparatus according to FIG. 1 with a further embodiment of a clamping lever, in which the centring shoulder is in front of the free end of the hook in mounting direction T in the standby position.

Especially preferably, the centring shoulder 20 is located at least on the same level (see e.g. FIG. 1) as the free end 24 of the hook 15, but preferably in front of the free end 24 of the hook 15 (see e.g. FIG. 2), when the clamping lever 17 is in the standby position in mounting direction T of the poultry body or the part thereof onto the support body 11. FIG. 2 shows an embodiment in which the breast cap hits the centring shoulder 20 before the hook 15, spatially and in terms of time, when being mounted in the mounting direction. The centring shoulder 20 can preferably have a hook shape in order to reliably "capture" the breast plate between the coracoid bones. The centring shoulder 20, however, may also have different shapes and dimensions in height (with larger or smaller overhang with respect to the support body 11 than shown) and width (into the plane of the sheet).

In all embodiments, in the standby position of the clamping lever 17, the clamping jaw 16 of the clamping lever 17 is preferably in a retracted position inside the support body 11 and, in the standby position of the clamping lever 17, the centring shoulder 20 of the clamping lever 17 projects beyond the support body 11, while, in the clamping position of the clamping lever 17, the clamping jaw 16 of the clamping lever 17 projects beyond the support body 11 and, in the clamping position of the clamping lever 17, the centring shoulder 20 of the clamping lever 17 is in a retracted position inside the support body 11. The position of clamping jaw 16 on the one hand and centring shoulder 20 on the other depends accordingly on the respective functionality of the clamping lever 17. For centring, the centring shoulder 20 is located in the operating area of the breast cap to be mounted. The breast cap thus inevitably strikes against the centring shoulder 20. For securing, the clamping jaw 16 is located in the operating area of the breast cap. The fact that both the clamping jaw 16 and the centring shoulder 20 are part of the clamping lever 17 ensures synchronised and coordinated movement of the clamping lever 17 between the two functionalities.

The clamping lever 17 may be composed of a plurality of components. In other words, clamping jaw 16 and/or centring shoulder 20 may be connected as individual parts to a main body 25 of the clamping lever 17. Preferably, the centring shoulder 20 is integrally connected to the main body 25 to form the clamping lever 17, as is the clamping jaw 16. Accordingly, the clamping lever 17 is formed integrally and rigidly. Regardless of its actual embodiment, the clamping lever 17 is movable out of the standby position into the clamping position via the centring shoulder 20 controlled by the product. Optionally, the pivot movement, initiated by the breast cap or the operator who mounts the breast cap, can be additionally supported, e.g. by the actuating means 23, via a cam drive or the like, in order, for example, to fasten the breast cap even more securely on the support body 11 prior to processing which exerts a high load on the breast cap.

Figure 3:
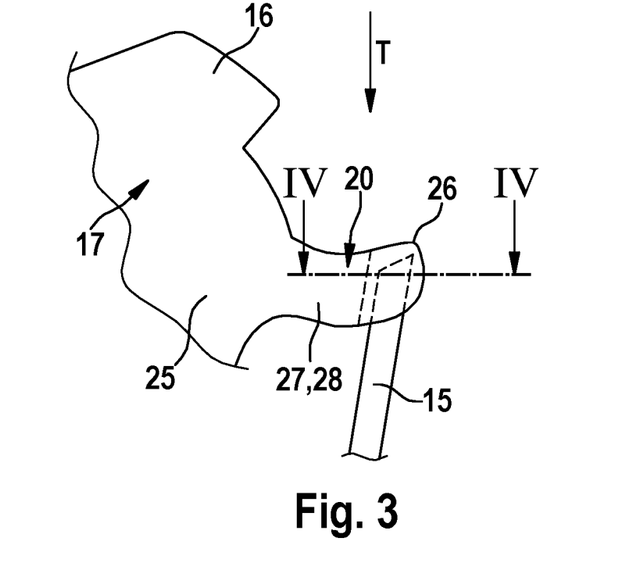
FIG. 3 is a detail view of the clamping lever in a further embodiment, in which the hook is arranged between the centring shoulder in the standby position of the clamping lever.
Figure 4:
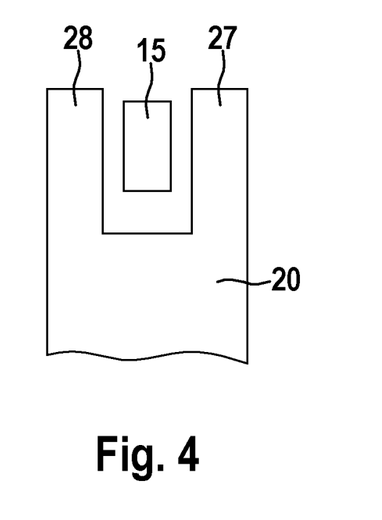
FIG. 4 is a sectional view of the embodiment according to FIG. 3 taken along line IV-IV.

In the embodiments illustrated and preferred, the centring shoulder 20 forms the free end 26 of the clamping lever 17 in such a manner that the centring shoulder 20 precedes at a fixed distance when the clamping lever 17 moves out of the standby position into the clamping position of the clamping jaw 16. The free end 26 may have different shapes and designs. FIGS. 1 and 2 show, for example, a closed hook shape. In a further embodiment according to FIGS. 3 and 4, the centring shoulder 20, viewed in mounting direction T, is U-shaped in such a manner that, at least in the standby position of the clamping lever 17, the hook 15 is located between the two limbs 27, 28 of the U-shaped centring shoulder 20 or, when the clamping lever 17 moves out of the standby position into the clamping position, can insert into the centring shoulder 20 or insert through the centring shoulder 20. The free end 24 of the hook 15 can close approximately flush with the centring shoulder 20 in the standby position of the clamping lever 17. In the standby position of the clamping lever 17, the free end 24 of the hook 15 is preferably retracted with respect to the centring shoulder 20 in mounting direction T. In individual embodiments, the centring shoulder 20 at least partially covers the free end 24 of the hook 15 frontally, at least when the clamping lever 17 is in the standby position, namely in mounting direction T. In other embodiments, the centring shoulder 20 at least partially covers the free end 24 of the hook 15 laterally, at least when the clamping lever 17 is in the standby position, namely parallel to the mounting direction T.

In a preferred development of the holding apparatus 10, only shown schematically, the clamping lever 17 is connected to a locking mechanism that is self-locking in the clamping position, for example in the form of a toggle joint mechanism. In other words, the clamping lever 17 is associated with a locking mechanism, e.g. the spring 21. This is to be achieved, for example, by the actuating means 23 in cooperation with a cam drive or the like, in order to bring the clamping lever 17 out of the clamping position back into the standby position again.

Figure 5:
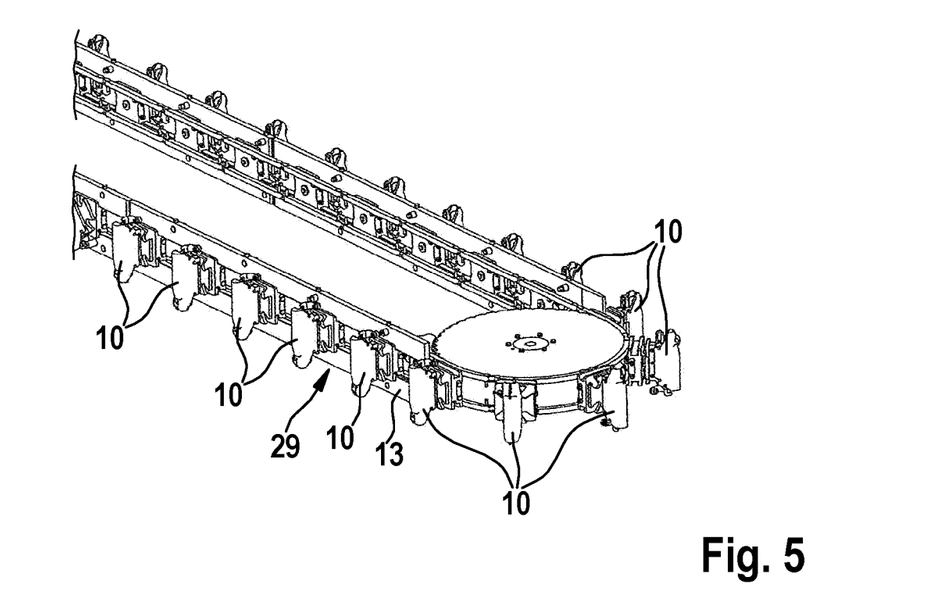
FIG. 5 is a detail view of a circulatingly driven transport unit with a plurality of holding apparatuses according to FIGS. 1 to 4.
Figure 6:
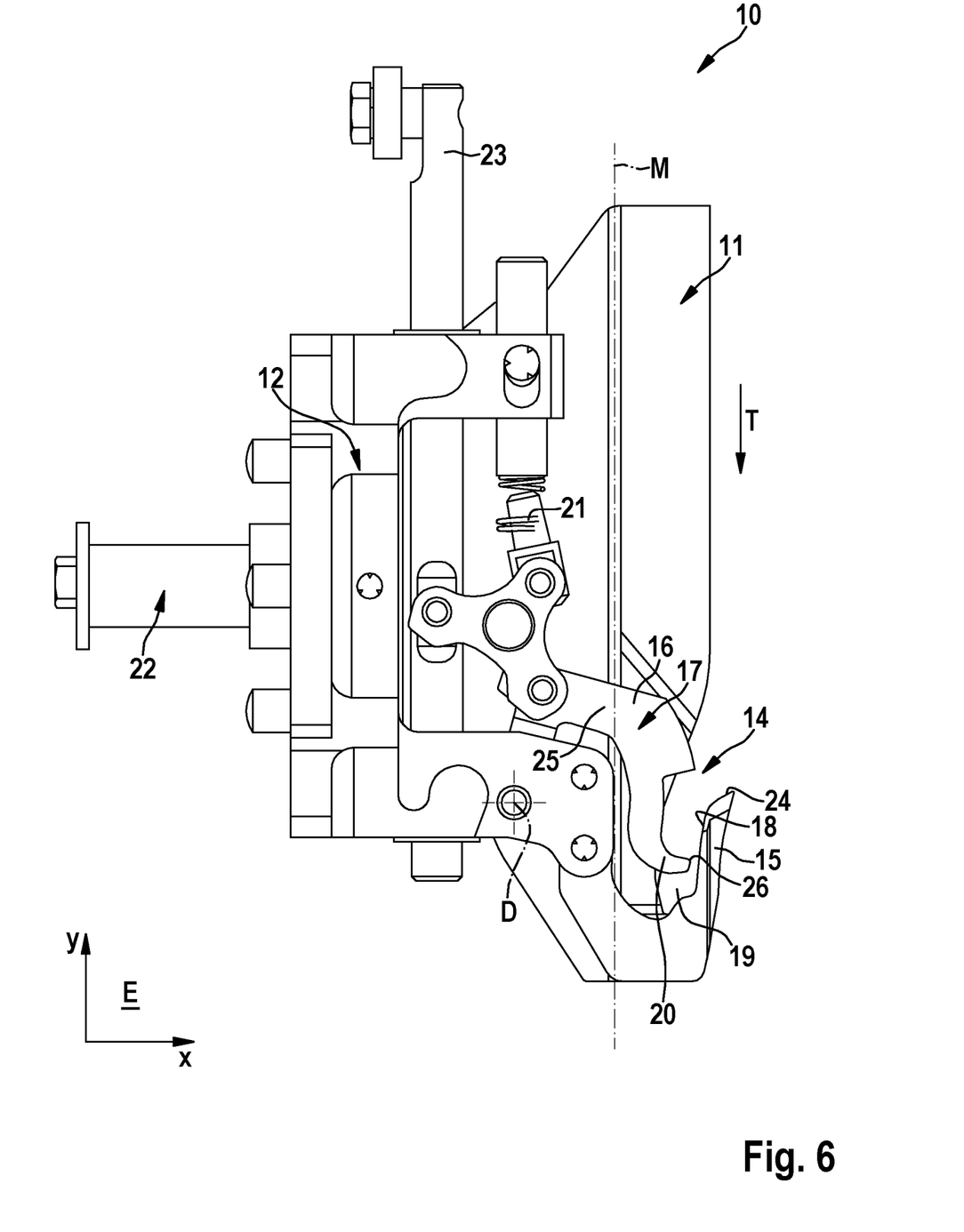
FIG. 6 is a view of the holding apparatus according to FIG. 1, the clamping lever being in an intermediate position.

The holding apparatus 10 can be designed as a single part, retrofit kit or replacement part. However, such holding apparatuses 10 are usually part of a transport apparatus 29. Transport apparatuses 29 are configured and adapted for transporting breast caps or other poultry parts and comprise a circulatingly driven (by means of a drive not explicitly shown) transport unit 13 and at least one holding apparatus 10 fastened thereto, which is configured and adapted for holding the gutted poultry bodies or parts thereof during processing in an apparatus for processing gutted poultry bodies or parts thereof. However, a plurality of the holding apparatuses 10 are usually attached to the transport unit 13 (see in particular FIG. 5). Preferably, the or each holding apparatus 10 is configured and adapted according to the preceding description. The transport unit 13 is preferably a transport chain to which the holding apparatuses 10 are releasably fastened via their fastening means 22. Such transport apparatuses 29, as described previously, are preferably arranged in an apparatus for processing gutted poultry bodies or parts thereof.

These apparatuses are configured and adapted for processing gutted poultry bodies or parts thereof and comprise at least one processing station for processing the poultry bodies or parts thereof as well as a transport apparatus 29 for transporting the poultry bodies or parts thereof along the or each processing station, the transport apparatus 29 being configured and adapted as described previously. In particular a measuring unit, comprising two circular knives arranged at a distance from each other which are configured and adapted for cutting free the breast bone, is provided as a processing station.

The method according to the invention is described in greater detail below based on the drawing.

The method describes saddle-mounting a gutted poultry body or a part thereof onto a holding apparatus 10. Saddle-mounting of poultry bodies or parts thereof is described based on the example of a breast cap as part of a poultry body. First the poultry body part is mounted on a support body 11 of the holding apparatus 10. Mounting can be automated. However, manual loading of the holding apparatus 10 by an operator is preferred. For this purpose, the poultry body part is placed over the support body 11 with a preferably pulling movement. In the process, the poultry body part, when being mounted with parts of the poultry body to be clamped, e.g. a cartilage or bone component, based on the example of the breast cap with a breast plate, is brought into a free space 19 formed between the support body 11 and a hook 15 of a clamping device 14, while the fixed hook 15 penetrates soft parts of the poultry body part. To secure the poultry body part, a clamping lever 17 of the clamping device 14 is moved out of a standby position into a clamping position in which the clamping jaw 16 of the clamping lever 17 secures the poultry body part or the parts to be clamped between itself and the hook 15.

This method is characterised according to the invention in that the poultry body part is centred on the support body 11 by means of a centring shoulder 20 of the clamping lever 17, before the hook 15 penetrates the soft parts. Thus, operator-independent centring of the poultry body part on the support body 11 takes place prior to complete or partial penetration of the hook 15.

In the same way, whole/complete, gutted poultry bodies or parts other than the breast cap can also be saddle-mounted on the holding apparatus 10. What is essential is that the poultry body or the part thereof has cartilage and/or bone components which come into contact with the centring shoulder.

Preferably, the method is configured and adapted for saddle-mounting of breast caps as part of the poultry body, the breast cap, when mounting onto the support body 11 in mounting direction T, first hitting the centring shoulder 20 with bone components, preferably with the breast plate disposed between the coracoid bones in the region of the breast bone, and being thereby centred and, as mounting continues, the hook 15 completely penetrating the soft parts of the breast cap and at the same time the clamping lever 17 being pivoted out of the standby position into the clamping position to secure the breast cap.

Advantageously, the clamping lever 17 is pivoted from the standby position into the clamping position controlled exclusively by the product, pivoting of the clamping lever 17 out of the standby position only being initiated by the breast cap once the breast cap has been brought into a symmetrical position due to a contact of bone components with the centring shoulder 20.

Especially preferably, the method is executed with a previously described apparatus for processing gutted poultry bodies or parts thereof

The invention claimed is:

1. A holding apparatus which is configured and adapted for holding a gutted poultry body or a part thereof during processing in an apparatus for processing gutted poultry bodies or parts thereof, the holding apparatus comprising:
   a support body configured and adapted for supporting the poultry body or the part thereof;
   a fastening body configured and adapted for holding the support body and for fastening the holding apparatus to a circulatingly driven transport unit of the apparatus for processing gutted poultry bodies or parts thereof; and
   a clamping device configured and adapted for securing the poultry body or the part thereof to the support body during processing;
   wherein the clamping device comprises a hook configured and adapted for penetrating into soft parts of the poultry body or the part thereof and a clamping lever, the clamping lever comprising a clamping jaw configured and adapted for clamping parts of the poultry body or the part thereof against a lower side of the hook directed towards the support body;
   wherein the hook is arranged such that the lower side of the hook is spaced apart from the support body in order to form a free space for receiving the parts of the poultry body or a part thereof to be clamped, and the clamping lever is designed so as to be movable, counter to a spring force, out of a standby position into a clamping position, and back again;
   wherein in addition to a clamping jaw, the clamping lever comprises a centring shoulder which projects into the free space between the lower side of the hook and the support body when the clamping lever is in the standby position.

2. The holding apparatus according to claim 1, wherein the holding apparatus is configured and adapted for a mounting direction of the poultry body or the part thereof onto the support body, which extends parallel to a plane of symmetry of the support body and is directed contrary to a free end of the hook.

3. The holding apparatus according to claim 2, wherein, transverse to the mounting direction, the centring shoulder extends over part of a width of the support body.

4. The holding apparatus according to claim 2, wherein, transverse to the mounting direction, the centring shoulder is wider than the free end of the hook.

5. The holding apparatus according to claim 2, wherein the centring shoulder is located at least on a same level as the free end of the hook when the clamping lever is in the standby position, in the mounting direction of the poultry body or the part thereof onto the support body.

6. The holding apparatus according to claim 5, wherein the centring shoulder is located in front of the free end of the hook, when the clamping lever is in the standby position, in the mounting direction of the poultry body or the part thereof onto the support body.

7. The holding apparatus according to claim 5, wherein the apparatus is configured and adapted for holding a breast cap.

8. The holding apparatus according to claim 2, wherein the centring shoulder forms a free end of the clamping lever in such a manner that the centring shoulder precedes at a fixed distance when the clamping lever moves out of the standby position into the clamping position of the clamping jaw.

9. The holding apparatus according to claim 2, wherein the centring shoulder at least partially covers the free end of the hook frontally, at least when the clamping lever is in the standby position, namely in the mounting direction, or laterally, namely parallel to the mounting direction.

10. The holding apparatus according to claim 2, wherein the centring shoulder, viewed in mounting direction, is U-shaped in such a manner that, at least in the standby position of the clamping lever, the hook is located between two limbs of the U-shaped centring shoulder.

11. The holding apparatus according to claim 2, wherein the centring shoulder, viewed in mounting direction, is U-shaped in such a manner that, when the clamping lever moves out of the standby position into the clamping position, the hook can insert into the centring shoulder or insert through the centring shoulder.

12. The holding apparatus according to claim 1, wherein the centring shoulder extends into a region close to the lower side of the hook directed towards the support body when the clamping lever is in the standby position.

13. The holding apparatus according to claim 1, wherein, in the standby position of the clamping lever, the clamping jaw of the clamping lever is in a retracted position inside the support body and, in the standby position of the clamping lever, the centring shoulder of the clamping lever projects beyond the support body, while, in the clamping position of the clamping lever, the clamping jaw of the clamping lever projects beyond the support body and, in the clamping position of the clamping lever, the centring shoulder of the clamping lever is in a retracted position inside the support body.

14. The holding apparatus according to claim 1, wherein the centring shoulder is integrally joined to the clamping lever, wherein the clamping lever is movable out of the standby position into the clamping position via the centring shoulder by contact with the poultry body or the part thereof.

15. The holding apparatus according to claim 1, wherein the clamping lever is connected to a locking mechanism which is self-locking in the clamping position.

16. A transport apparatus, configured and adapted for transporting gutted poultry bodies or parts thereof, comprising:
   a circulatingly driven transport unit; and
   at least one holding apparatus fastened thereto, which is configured and adapted for holding the gutted poultry body or the part thereof during processing in an apparatus for processing gutted poultry bodies or parts thereof;

wherein each of the at least one holding apparatus comprises the holding apparatus according to claim 1.

17. An apparatus for processing gutted poultry bodies or parts thereof, comprising:

at least one processing station for processing the poultry bodies or parts thereof; and a transport apparatus for transporting the poultry bodies or parts thereof along the at least one processing station;

wherein the transport apparatus comprises the transport apparatus according to claim 16.

18. A method for saddle-mounting a gutted poultry body or a part thereof onto a holding apparatus according to claim 1, comprising the steps:

mounting the poultry body or a part thereof onto a support body of the holding apparatus;

wherein the poultry body or the part thereof, when being mounted with parts of the poultry body or the part thereof to be clamped, is brought into a free space formed between the support body and a hook of a clamping device, while the hook penetrates soft parts of the poultry body or the part thereof; and moving a clamping lever of the clamping device out of a standby position into a clamping position in which a clamping jaw of the clamping lever secures the poultry body or the part thereof or the parts to be clamped respectively between the clamping jaw and the hook;

wherein the poultry body or the part thereof is centred on the support body by a centring shoulder of the clamping lever, before the hook penetrates the soft parts.

19. The method according to claim 18, wherein the method is configured and adapted for saddle-mounting of breast caps as part of the poultry body, wherein the breast cap, when mounting onto the support body in a mounting direction, first hits the centring shoulder with bone components and is thereby centred and, as mounting continues, the hook completely penetrates the soft parts and at the same time the clamping lever is pivoted out of the standby position into the clamping position to secure the breast cap.

20. The method according to claim 19, wherein the clamping lever is pivoted from the standby position into the clamping position controlled exclusively by contact with the breast cap, wherein pivoting of the clamping lever out of the standby position is only initiated by the breast cap once the breast cap has been brought into a symmetrical position due to a contact of bone components with the centring shoulder.

* * * * *